US007465938B1

(12) United States Patent
Hindi et al.

(10) Patent No.: US 7,465,938 B1
(45) Date of Patent: Dec. 16, 2008

(54) SYSTEM AND METHOD FOR CAPTURING SCINTILLATION EVENTS

(75) Inventors: Munther M. Hindi, Campbell, CA (US); Lee M. Klynn, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 266 days.

(21) Appl. No.: 11/595,567

(22) Filed: Nov. 10, 2006

Related U.S. Application Data

(60) Provisional application No. 60/735,255, filed on Nov. 10, 2005.

(51) Int. Cl.
G01T 3/06 (2006.01)
G01T 1/20 (2006.01)
(52) U.S. Cl. .............. 250/390.11; 250/370.05; 250/370.09; 250/370.11; 250/390.01
(58) Field of Classification Search ............ 250/370.05, 250/370.09, 370.11, 390.01, 390.02, 390.11, 250/390.12
See application file for complete search history.

(56) References Cited

U.S. PATENT DOCUMENTS

| 6,281,509 B1 * | 8/2001 | Ryan et al. ........... 250/397 |
| 7,274,020 B1 | 9/2007 | Hindi et al. |
| 2008/0128631 A1 * | 6/2008 | Suhami .............. 250/370.09 |

OTHER PUBLICATIONS

Ryan, JM, JR Marci, ML McConnell, RA Messner, W Li, HH Cutlip, Q Zheng, CM Casaneda, and JL Romero, "A Scintillating Plastic Fiber Tracking Detector for Neutron and Proton Imaging and Spectroscopy," IEEE, p. 483-488, 2000.*

Terasawa, K, T. Doke, N. Hasebe, J. Kikuchi, K. Kudo, T. Murakami, N. Takeda, T. Tamura, S. Torii, M. Yamashita and E. Yoshihira, "Scintillating Fiber Camera for Neutron Dosimetry in Spacecraft," Nuclear Instruments and Methods in Physics Research A 457 (2001) 499-508.*

K. Terasawa, et al., "A Small Scintillating Fiber Camera Consisting of 0.25-mm Square Fibers for Space Dosimtery," IEEE Transactions On Nuclear Science, Aug. 2001, vol. 48, No. 4.

James M. Ryan, et al., "SONTRAC: an Imaging Spectrometer for Solar Neutrons," University of New Hampshire, Physikalisches Institut, Bern.

* cited by examiner

Primary Examiner—David P. Porta
Assistant Examiner—Casey Bryant
(74) Attorney, Agent, or Firm—McDermott Will & Emery LLP

(57) ABSTRACT

A photon generating event capture system is configured to capture light photons. Image intensifiers are arranged to amplify light photons and sensors are arranged to capture the amplified light photons. A control system detects the amplification of light photons by the image intensifiers. Upon detecting amplification, the control system deactivates the image intensifiers to shutdown further light photon amplification and switches the sensors from a clear mode to an acquisition mode within a period of time less than a decay time of the image intensifiers. The locations and intensities of the amplified light photons are then captured and read out by the sensors. By operating the sensors in a clear mode prior to detecting amplification of light photons, noise recorded by the sensors prior to the detection of light photon amplification is either shifted out of the sensor prior to the photon generating event or is smeared across the sensor data. The effects of system noise can be reduced by detecting and removing this smeared sensor data.

28 Claims, 7 Drawing Sheets

SYSTEM AND METHOD FOR CAPTURING SCINTILLATION EVENTS

This application claims the benefit of U.S. Provisional Patent Application No. 60/735,255 filed on Nov. 10, 2005, which is hereby incorporated herein by reference.

STATEMENT REGARDING FEDERALLY SPONSORED RESEARCH OR DEVELOPMENT

Not applicable.

FIELD OF THE INVENTION

The invention concerns the detection of radiation, and more particularly concerns a system and method for capturing scintillation events generated in a scintillator block upon interaction with incident radiation.

BACKGROUND OF THE INVENTION

The ability to detect and identify radiation such as gamma rays is a very useful tool for a variety of applications. The applications range from medical imaging systems to anti-terrorism security monitors. For example, the gamma rays emitted by a concealed "dirty bomb" will give away the bomb's location if properly detected and identified. Gamma ray detection can also be used to map hot spots following a nuclear accident or to monitor for leakage of radioactive waste.

One type of gamma ray detection system that has been proposed uses a block of fiber-optic scintillators. Incident gamma rays scatter within the scintillator block depositing energy at various locations. Some of this energy is converted to scintillation light by the fiber-optic scintillators. By detecting the locations and intensities of this scintillation light generated within the scintillator block, the energy and direction of the incident gamma rays can be determined. U.S. application Ser. No. 10/866,760, entitled "Gamma Vector Camera" and filed on Jun. 15, 2004, describes a method and system for making such determination and is hereby incorporated herein by reference.

To capture the scintillation light, charge-coupled devices (CCD) may be used to record the locations and intensities of the scintillation light generated by the scintillator block. CCDs offer a solution that is generally cost effective and readily available for implementation. However, the scintillation light generated within a scintillator block is relatively weak. This weakness, together with the average noise levels of CCDs, can prevent the accurate recording of intensities and locations of the scintillation light.

Amplification of the scintillation light before it reaches the CCD offers one solution to overcoming noise within a CCD. For example, an image intensifier may be used to amplify the scintillation light above the average noise level of the CCD. However, image intensifiers introduce noise, such as thermal noise, to the system.

Accordingly, a need exists for a system capable of amplifying scintillation light to a level high enough to overcome CCD noise levels and capable of minimizing the effects of noise introduced to the system by the light amplifier.

SUMMARY OF THE INVENTION

The present invention addresses the foregoing issues by using image intensifiers with phosphors having a suitably chosen decay time, along with appropriately matching system components, to mitigate the effects of noise in a light photon event capture system. An image intensifier with a sufficiently long decay time results in noise being recorded as streaks by system sensors. Deactivating the image intensifiers and controlling sensors upon detecting the amplification of light by the image intensifiers allows desired light to be recorded in focused locations on the sensors. The effects of noise can then be mitigated by separating the streaked image data from the focused image data to identify the locations and intensities of light photon event.

According to one embodiment of the invention, a method for capturing scintillation events generated by a scintillator block upon interaction with incident radiation is proposed. The method includes activating image intensifiers that are configured to amplify scintillation light produced at respective faces of the scintillator block. Sensors, which are optically coupled to respective ones of the image intensifiers, are initially operated in a clear mode. Coincident amplification of scintillation light by the image intensifiers is detected and upon detection the images intensifiers are deactivated. The sensors are then switched from the clear mode to an acquisition mode in which the amplified scintillation light generated by the image intensifiers is captured by the sensors. The sensors are switched from the clear mode to the acquisition mode in a period of time less than a decay time of phosphors in the image intensifiers. The sensors are then switched from the acquisition mode to a read mode during which the locations and intensities of the amplified scintillation light captured in the acquisition mode is read out of the sensors.

According to another embodiment of the invention, a scintillation event capture system for capturing scintillation events generated by a scintillator block upon interaction with incident radiation is provided. The system includes image intensifiers configured to amplify scintillation light produced by the scintillation block at respective faces of the scintillator block. Sensors are optically coupled to respective ones of the image intensifiers. A control system is configured to detect coincident amplification of scintillation light by the image intensifiers and upon detecting coincident amplification the image intensifiers are deactivated. The sensors are then switched from a clear mode to a capture mode which includes an acquisition mode and a read mode. During the acquisition mode, the amplified scintillation light generated by the image intensifiers is captured. During the read mode, the locations and intensities of the amplified scintillation light captured in the acquisition mode are read out. The control system is configured to switch the sensors from the clear mode to the acquisition mode in a period of time less than a decay time of the image intensifiers.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
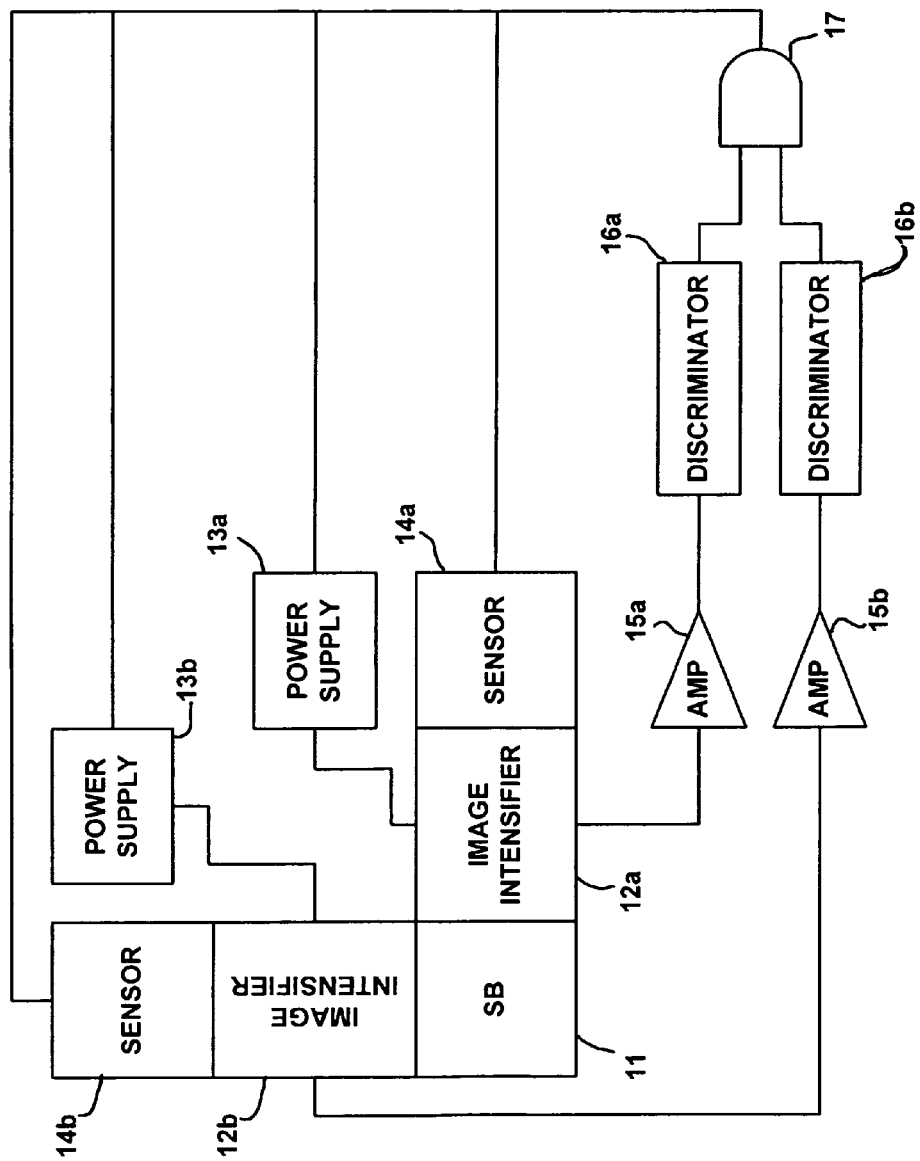
FIG. 1 is a block diagram of a scintillation event capture system according to one embodiment of the invention.

FIG. 1 is a block diagram depicting components of a scintillation event capture system according to one embodiment of the invention. As shown in FIG. 1, scintillation event capture system 10 includes a scintillator block 11, image intensifiers 12a and 12b, power supplies 13a and 13b, sensors 14a and 14b, amplifiers 15a and 15b, discriminators 16a and 16b and a logical AND gate 17. As described in more detail below, image intensifiers 12a and 12b amplify scintillation light generated by scintillator block 11 upon interaction with incident radiation, such as gamma rays. Sensors 14a and 14b capture the amplified scintillation light and read out the locations and intensities of the captured light. A control system, which includes amplifiers 15a and 15b, discriminators 16a and 16b and logical AND gate 17, controls the operation of the system using a trigger signal so as to mitigate the effects of noise within the system.

Figure 2:
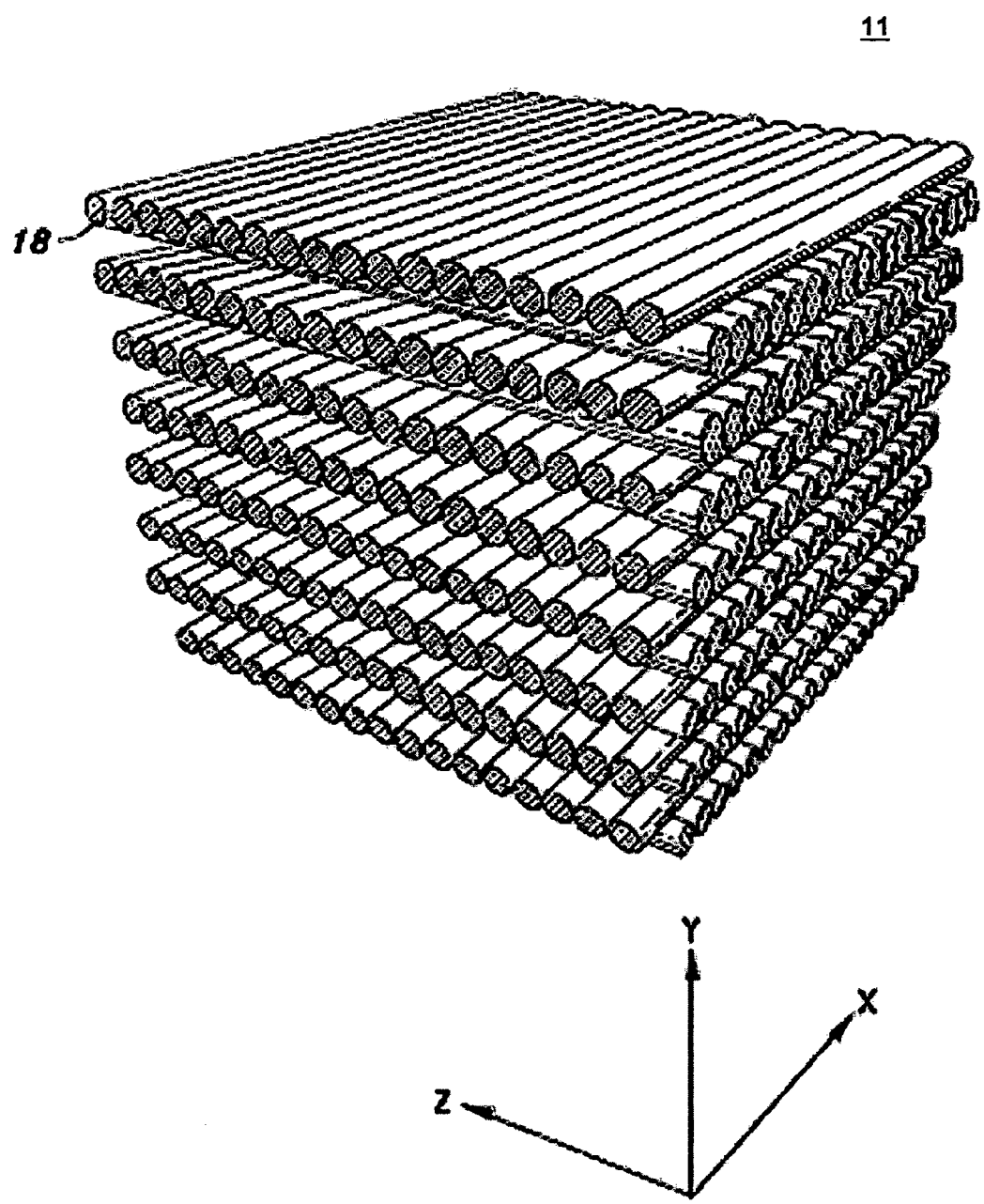
FIG. 2 is representation of a scintillator block according to one embodiment of the invention.

Scintillator block 11 is a block of material that generates scintillation light upon interaction with incident gamma rays. As described more fully in related application Ser. No. 10/866,760, the arrangement, dimensions and materials used to form scintillator block 11 are selected based on the intended application and the energy range of the radiation to be detected. One example of scintillator block 11 is shown in FIG. 2. In this example, multiple layers of fiber-optic scintillators 18 are used to form a cube. The fiber-optic scintillators 18 used to form each layer are arranged parallel to each other in a plane and are oriented in a direction that is orthogonal to the direction of the fiber-optic scintillators 18 arranged in adjacent layers. In this manner, half of the fiber-optic scintillators 18 are parallel to the z-axis and terminate in the x-y plane, while the other half of the fiber-optic scintillators 18 are parallel to the x-axis and terminate in the y-z plane. One skilled in the art will recognize that the shapes and dimensions of both the individual fiber-optic scintillators 18 and scintillator block 11 can vary without departing from the scope of the invention.

The scintillation light that is generated by scintillator block 11 is typically relatively weak, which can be problematic if the sensors used to capture and record the scintillation light have noise levels comparable to the intensity of the scintillation light. To avoid a scenario in which sensor noise prevents an accurate reading of captured scintillation light, image intensifiers are used to amplify the scintillation light prior to reaching the sensors. As shown in FIG. 1, image intensifier 12a is configured between scintillator block 11 and sensor 14a to amplify scintillation light produced at one face of scintillator block 11. Similarly, image intensifier 12b is configured between scintillator block 11 and sensor 14b to amplify scintillation light produced at another face of scintillator block 11. According to one embodiment of the invention, image intensifier 12a is arranged in the x-y plane on one face of scintillator block 11 to amplify the scintillation light generated within the fiber-optic scintillators 18 arranged parallel to the z-axis as shown in FIG. 2. Similarly, image intensifier 12b is arranged on the y-z plane on a second face of scintillator block 11 orthogonal to the first face to amplify the scintillation light generated with fiber-optic scintillators 18 arranged parallel to the x-axis as shown in FIG. 2. While FIG. 1 depicts two image intensifiers on two respective orthogonal faces of scintillator block 11, one skilled in the art will understand that other embodiments using additional image intensifiers on other faces of the scintillator block can be used without departing from the scope of the invention. In other embodiments, multiple image intensifiers may be arranged on a single face of scintillator block 11.

Figure 3:
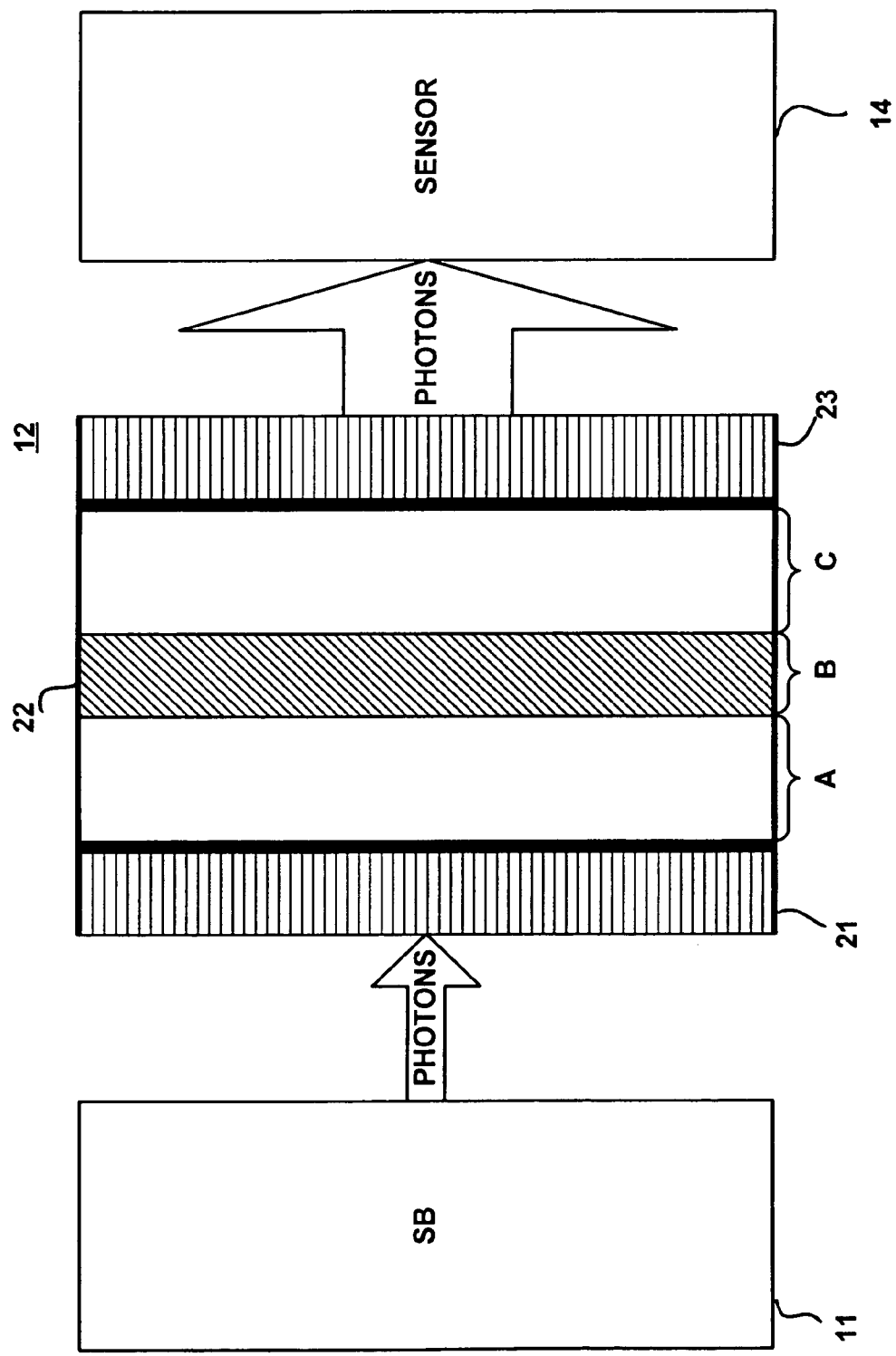
FIG. 3 is a block diagram of an image intensifier according to one embodiment of the invention.

FIG. 3 is a block diagram depicting an arrangement of an image intensifier 12 according to one embodiment of the invention. As shown in FIG. 3, image intensifier 12 includes a photocathode 21, a micro-channel plate 22 and a phosphor screen 23. Photocathode 21 coverts the photons of scintillation light produced by scintillator block 11 into electrons. A voltage applied across A accelerates the electrons towards micro-channel plate 22. The electrons are then accelerated through micro-channel plate 22 by a voltage applied across B. While passing through micro-channel plate 22, the electrons are multiplied. The amplified/multiplied electrons are then accelerated towards phosphor screen 23 by a voltage applied across C. Phosphor screen 23 then converts the amplified/multiplied electrons into photons, which are subsequently captured and recorded by sensor 14. The voltages applied across A, B and C are supplied by a power supply (not shown in FIG. 3) such as power supplies 13a and 13b depicted in FIG. 1.

Image intensifier 12 is optically coupled to scintillator block 11 and sensor 14. The optical coupling allows the light photons to travel between the components and can be done in any of a number of ways known to those skilled in the art. For example, fiber optics may be used to guide the photons between the components in the form of a fiber-optic faceplate. Alternatively, one or more lenses may be used to focus and direct the light photons from one component to the next. It is to be understood that the method used to optically couple the scintillator block 11 to image intensifier 12 may be the same or different than the method used to optically couple image intensifier 12 to sensor 14. It is further noted that the different sizes of the arrows representing photons in FIG. 3 are intended to represent increased intensity and not necessarily an increase in the size of the area generating the light photons.

As noted above, sensor 14 is optically coupled to image intensifier 12 and is used to capture and record the amplified scintillation light generated by image intensifier 12. According to one embodiment of the invention, sensor 12 comprises an array of elements, such as a charge-coupled device. As the amplified scintillation light impinges on the array of elements, each element captures an intensity of the light that reaches its respective location in the array. In this manner, sensor 14 is able to capture and record the location and intensities of the amplified scintillation light. This concept is well known to those skilled in the art and will not be further described herein. Using the scintillator block 11 depicted in FIG. 2, the number of elements in sensor 12 is at least equal to the number of fiber-optic scintillators 18 from which the sensor is detecting scintillation light. The sensor may be configured to observe all or only a portion of the scintillator block. Preferably, the number of elements is greater than the number of fiber-optic scintillators being observed by the sensor resulting in a ratio of elements to scintillators such as 4 to 1, 16 to 1, etc.

Sensor 14 operates in at least three modes: a clear mode, an acquisition mode and a read mode. In the clear mode, the elements in the array of sensor 14 are cleared in preparation for capturing scintillation light. The elements are cleared using a parallel shift routine in which the contents of each row of elements are shifted from one row to the next across the array until the contents are shifted out of the array. This parallel shift routine can also be done using columns instead of rows. The acquisition mode stops the parallel shift routine and allows the elements of the array in sensor 14 to capture the scintillation light. The duration of the acquisition mode is controllable to allow for different applications. Finally, the read mode allows the locations and intensities of the captured scintillation light to be read out by using a parallel shift routine similar to the one for the clear mode. As the contents of each row or column reach the edge of the array of elements, they are stored for further processing. Each of these three modes are well known to those skilled in the art and will not be described further herein.

To control the operation of scintillation event capture system 10, a control system is used to monitor image intensifiers 12a and 12b and control the operation of image intensifiers 12a and 12b and sensors 14a and 14b. As depicted in FIG. 1, the control systems comprises amplifiers 15a and 15b, discriminators 16a and 16b and logical AND gate 17. Amplifiers 15a and 15b amplify monitored signals generated from image intensifiers 12a and 12b, respectively. The monitored signals are compared against a threshold value in discriminators 16a and 16b, respectively. A logic signal or pulse is generated by discriminators 16a and 16b when the respective signals exceed the threshold value. Logical AND gate 17 is used to combine the logic pulses generated by discriminators 16a and 16b and generate a coincident logic signal or pulse to indicate when coincident amplification by image intensifiers 12a and 12b is detected. The components of the control system may be implemented using discrete components or may be implemented in a single ASIC or programmable chip. The operation of the control system will be described in further detail below.

Figure 4:
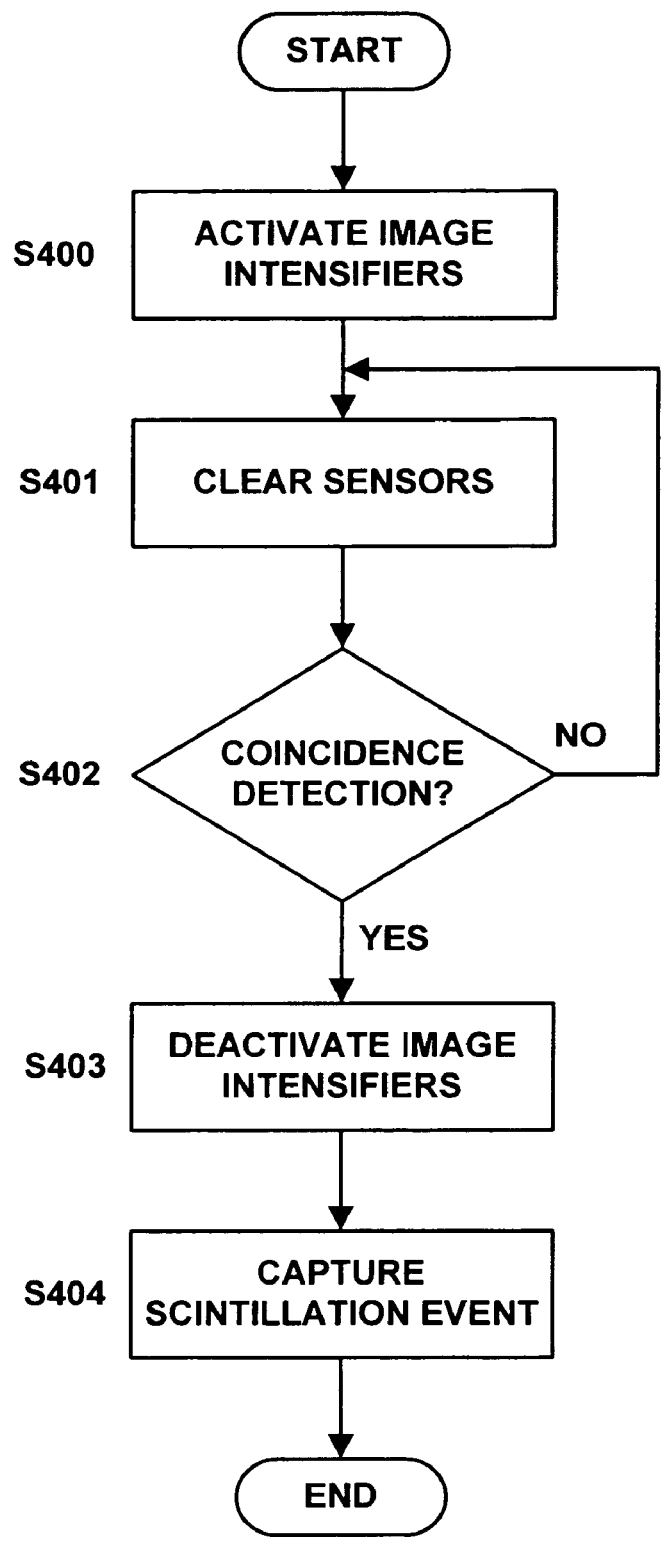
FIG. 4 is a flowchart depicting a method for capturing a scintillation event according to one embodiment of the invention.

FIG. 4 is a flowchart depicting steps of a method for capturing scintillation events according to one embodiment of the invention. Briefly, image intensifiers 12a and 12b are activated in step S400, sensors 14a and 14b are operated in a clear mode in step S401 while image intensifiers 12a and 12b are monitored to detect coincident amplification in step S402. Upon detecting coincident amplification, image intensifiers 12a and 12b are deactivated in step S403 and the scintillation event is captured in step S404. While the flowchart depicted in FIG. 4 represents a single flow of process steps, it is to be understood that the process can be performed in a continuous cycle where upon completion of step S404 the process returns to step S400.

Returning to step S400, image intensifiers 12a and 12b are activated at the beginning of the scintillation event capture method. To activate image intensifiers 12a and 12b, power supplies 13a and 13b are turned on to supply the voltages across A, B and C shown in FIG. 3. Once these voltages are applied, image intensifiers 12a and 12b will amplify scintillation light produced at the respective faces of scintillator block 11.

In addition to activating image intensifiers 12a and 12b at the beginning of the scintillation event capture method, sensors 14a and 14b are initiated and set to operate in a clear mode in step S401. As mentioned above, the clear mode causes the stored contents within sensors 14a and 14b to be shifted out and cleared in preparation for capturing a scintillation event. By operating sensors 14a and 14b in clear mode, noise generated by image intensifiers 12a or 12b and subsequently captured by sensors 14a or 14b, respectively, will be shifted out of the respective sensor.

While operating sensors 14a and 14b in clear mode, image intensifiers 12a and 12b are monitored in step S402 for coincident amplification of light. Because image intensifiers 12a and 12b can generate light photons due to noise, it is important to distinguish between this noisy light and light generated by scintillation light produced by scintillator block 11. Since scintillation light generated upon interaction with an incident gamma ray will generally be produced at multiple faces of scintillator block 11, the light generated by image intensifiers 12a and 12b will have a greater likelihood of being from scintillation light produced by scintillator block 11 rather than noise when both image intensifiers 12a and 12b are amplifying light at the same time. If only one of image intensifiers 12a and 12b is amplifying and generating light, that light will most likely be the result of noise from the image intensifier rather than scintillation light produced by scintillator block 11. Accordingly, detecting coincident amplification of light by image intensifiers 12a and 12b provides a mechanism for reducing the effects of noise within the system.

Figure 5:
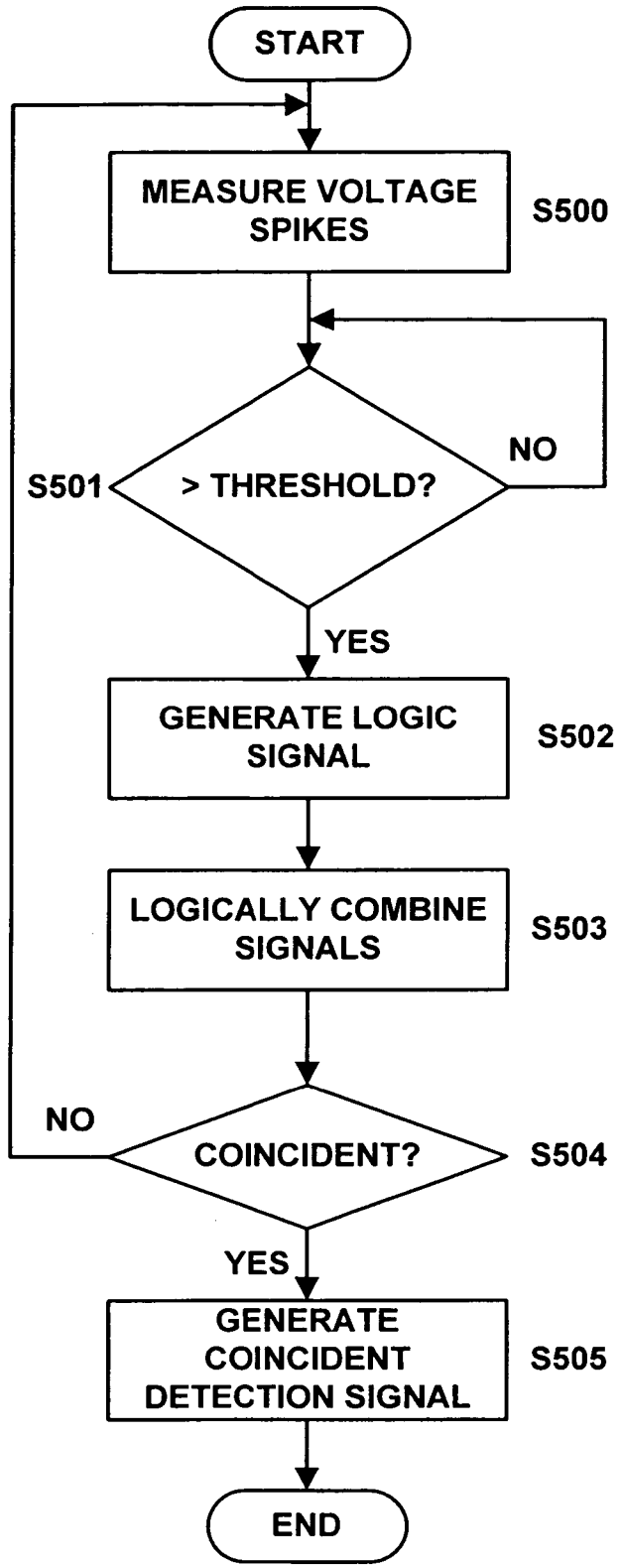
FIG. 5 is a flowchart depicting a method for detecting coincident amplification of scintillation light according to one embodiment of the invention.

FIG. 5 is a flowchart depicting process steps for detecting coincident amplification according to one embodiment of the invention. Briefly, the voltages applied across image intensifiers 12a and 12b are monitored for spikes in step S500. Any spikes are compared against a threshold value in step S501. If the measured spike exceeds the threshold voltage, a logic signal indicating a positive detection is generated in step S502. Logic signals corresponding to each of image intensifiers 12a and 12b are logically combined in step S503 to generate a coincident detection signal or pulse in step S505. This resultant coincident detection signal or pulse is used by the control system to control the operation of image intensifiers 12a and 12b and sensors 14a and 14b. While the flowchart depicted in FIG. 5 represents a single flow of process steps, it is to be understood that the process can be performed in a continuous cycle where upon completion of step S505 the process returns to step S500.

Returning to FIG. 3, a voltage is applied across micro-channel plate 22 (indicated by B in FIG. 3). When electrons are multiplied within micro-channel plate 22, the voltage applied across B will experience a spike due to the additional electrons supplied by micro-channel plate 22. These spikes are monitored or measured in step S500. To measure these spikes, a signal based on the change in voltage applied across B is amplified by an amplifier. As depicted in FIG. 1, amplifier 15a amplifies this signal generated from image intensifier 12a and amplifier 15b amplifies the signal generated from image intensifier 12b. The signal based on the change in voltage applied across B is amplified by an amplifier due to the relatively small magnitude of the voltage spikes across B.

The amplified signals from amplifiers 15a and 15b are then compared against a threshold value by discriminators 16a and 16b, respectively. The threshold value is predetermined and is selected to represent a spike due to the impingement of scintillation light on photocathode 21. Scintillation light can generally be distinguished from photocathode noise since scintillation light typically results in the simultaneous release of multiple electrons, while photocathode noise typically consists of the release of one electron at a time. With respect to the micro-channel plate, an electron emitted within the micro-channel plate will generally result in fewer electrons being generated by the micro-channel plate than the amount generated due to an electron that was emitted by the photocathode. Both of these situations result in smaller spikes in the voltage applied across B. By determining a proper threshold value, a significant percentage of spikes due to scintillation light can be distinguished from spikes due to noise. The threshold value can be determined through calibration tests performed on the system or through various calculation means to estimate the value.

If it is determined in step S501 that the spike is greater than the threshold value, a logic signal representing a positive detection is generated by discriminators 16a and 16b in step S502. These logic signals are then logically combined using logical AND gate 17 in step S503. Logical AND gate 17 combines the logic signals to filter those signals that are coincident in step S504. Due to the nature of an AND gate, logical AND gate 17 will produce a coincident detection signal or pulse in step S505 when the logic signal from discriminators 16a and 16b are coincident. As described further below, this coincident detection signal or pulse is used by the control system to control the operation of image intensifiers 12a and 12b and sensors 14a and 14b.

As described above, image intensifiers 12a and 12b are monitored to detect coincident amplification of light by using a threshold value to distinguish between light due to a scintillation event and light due to noise. In alternative embodiments of the invention, the detecting signal or pulse generated in step S505 may be produced by detecting a spike that exceeds the threshold voltage in only one image intensifier. While this embodiment might result in a reduction of the benefits of the invention, it allows the principles of the invention to be applied to systems using only a single image intensifier.

Returning to FIG. 4, sensors 14a and 14b are operating in clear mode in step S401 and image intensifiers 12a and 12b are monitored for coincident amplification in step S402 until a coincident detection logic signal/pulse is generated by the control system. Upon detecting coincident amplification, the coincident detection signal/pulse is sent to power supplies 13a and 13b in step S403 to deactivate image intensifiers 12a and 12b, respectively. Image intensifiers 12a and 12b are deactivated by switching the voltage applied across a portion or all of the respective image intensifier to a voltage that prevents the acceleration of electrons. Typically, the switched voltage is across either A or B. This deactivations stops, or at least significantly reduces, the generation of light at phosphor screen 23 until the voltage is restored.

Once image intensifiers 12a and 12b are deactivated in step S403, sensors 14a and 14b are switched from the clear mode to a capture mode in step S404 to capture the scintillation event amplified by the image intensifiers. The capture mode includes two sub-modes: an acquisition mode and a read mode. The acquisition mode causes the parallel shifting within the sensor to cease for a predetermined period of time to allow the sensor elements to capture the amplified scintillation light generated by the image intensifiers. Once the amplified scintillation light has been captured, the locations and intensities of the captured light are read out of the sensor in a read mode.

The performance capabilities of the individual components of the system and the timing of the steps described above play critical roles in the ability of the system to mitigate the effects of noise in the system. As noted above, sensors 14a and 14b operate in a clear mode pending the detection of coincident amplification by image intensifiers 14a and 14b. Because the contents of the sensor elements are parallel shifted across the sensor in clear mode, any light generated by image intensifiers 14a and 14b during this time would be captured by sensors 14a and 14b, respectively, and appear as a streak if the sensor data were read out. Alternatively, during the acquisition mode, the parallel shifting is halted allowing the amplified scintillation light to be captured and maintained at its respective locations on the sensor. Accordingly, light generated and captured due to noise will typically appear as streaks in the read out sensor data while the desired amplified scintillation light will be focused on locations within the sensor corresponding to areas of the scintillator block 11 that produced the scintillation light.

In order to keep the desired scintillation light within its original location in the read out sensor data, image intensifiers 12a and 12b must be deactivated and sensors 14a and 14b switched from the clear mode to the acquisition mode within a predetermined period of time. The predetermined period of time is dependent upon the operating parameters of image intensifiers 12a and 12b and sensors 14a and 14b. Upon detecting coincident amplification of scintillation light, image intensifiers 12a and 12b must be deactivated and sensors 14a and 14b switched from the clear mode to the acquisition mode in a period of time less than the parallel shift time of sensors 14a and 14b. The parallel shift time is understood to refer to the time required to conduct one parallel shift within the sensor. In this manner, the amplification of additional light beyond the desired scintillation event will be minimized and the scintillation light being amplified by the image intensifiers 12a and 12b will remain fixed on its original location within sensors 14a and 14b, respectively. For example, if the sensor had a parallel shift time of 30 μs, the control system must be capable of generating the coincident detection signal/pulse, the power supplies must be capable of gating off the voltage applied to the respective image intensifier in response to the coincident detection signal/pulse, and the sensors must be capable of switching from the clear mode to the acquisition mode in response to the coincident detection signal/pulse in a period of time less than 30 μs.

In addition to being capable of deactivating within a period of time less than a parallel shift time of the sensors, image intensifiers 12a and 12b must be capable of deactivating in a period of time short enough to reduce the chance of capturing two scintillation events due to two or more incident gamma rays. This period of time is dependent on the gamma ray source being detected as well as on the proximity of the system to that source. For example, image intensifiers 12a and 12b capable of deactivation within 100 ns of detection of coincident amplification would have a negligible chance of capturing two scintillation events due to a gamma ray source positioned within a range in which 1000 gamma rays/second are likely to interact with the scintillator block 11.

Upon deactivation, image intensifiers 12a and 12b temporarily store the scintillation light being amplified at the time of deactivation. This storage is made possible by the decay time associated with phosphor screen 23 in each image intensifier. The decay time of the phosphor screen represents the time required for the light emitted by the phosphor screen decay to a designated level. Typical levels include 10% or 1% of the original light output. The actual decay time is dependent upon the phosphor materials used in the phosphor screen 23. Phosphor decay times range from fractions of a μs to multiple ms.

To obtain optimal operation of the scintillation event capture system, a phosphor screen having an appropriate decay time is selected based on the operating parameters of the other components in the system. A primary consideration is that the sensors be capable of switching from the clear mode to the acquisition mode in response to a coincident amplification detection signal/pulse prior to the light output of the phosphor screen decaying below the average noise level of the sensors. If the light output drops below the average noise level of the sensors, it will be difficult to distinguish between the desired scintillation light and noise in the sensor. Accordingly, if the decay time of the phosphor screen 23 is calculated to be the period of time to decay to a level equal to the average noise level of the sensor, the control system must be capable of generating the coincident detection signal/pulse and the sensors must be capable of switching from the clear mode to the acquisition mode in a period of time less than the decay time.

The decay time of the phosphor screen 23 must also be long enough to ensure that noise in the image intensifiers is smeared during the clear mode of the sensors. Accordingly, the decay time of the phosphor screen should be longer than the parallel shift time of the sensors, and preferably a multiple of the parallel shift time of the sensors.

Once the acquisition mode of the sensors has completed, the image intensifiers must remain deactivated for the read mode of the sensors. In addition, the decay time of the phosphor screen must have lapsed prior to the switch from the acquisition mode to the read mode of the sensors. By controlling the switch times of the sensors and the deactivation of the image intensifiers, the desired amplified scintillation light remains focused on its original location within the sensor during the acquisition mode and decays away prior to the read mode. On the other hand, any noise from the image intensifier that occurred either shortly before the coincident detection or during the clear mode will appear as streaks in the data read out from the sensor.

Figure 6:
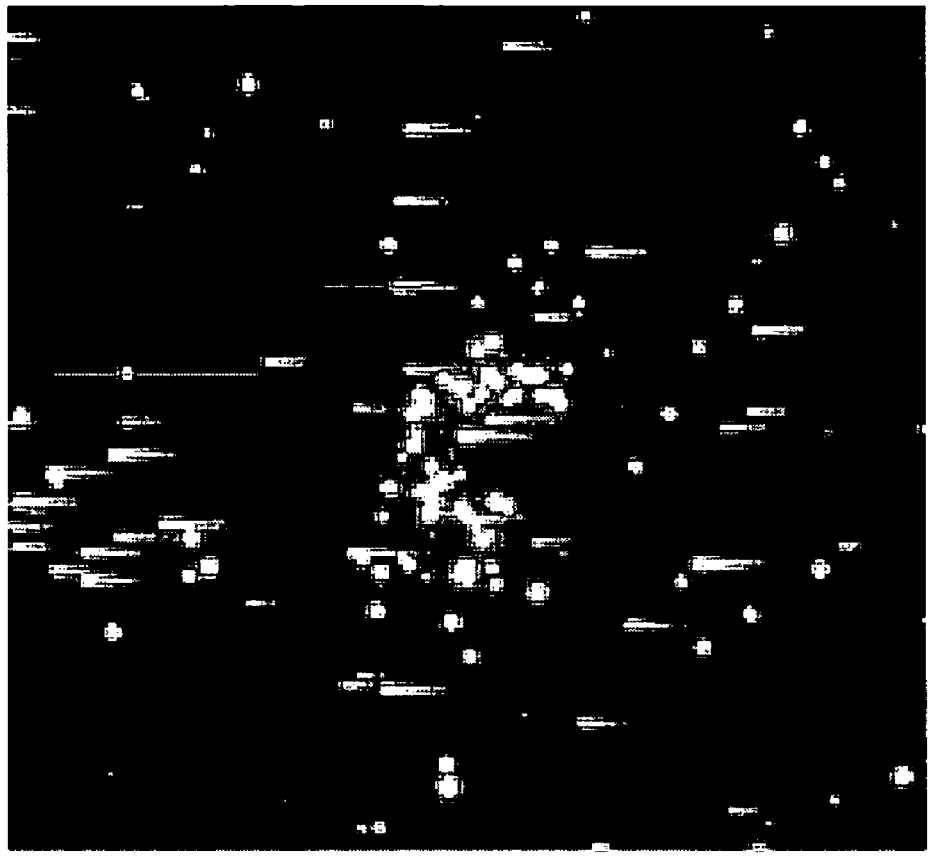
FIG. 6 is an image data of a sample captured light event.

FIG. 6 is an example of an image generated from sensor data of a captured light event. As can be seen in FIG. 6, portions of the captured light appear as streaks across the image while others appear as focused dots. Using known image processing techniques, the background noise of the image can be approximated and removed leaving the locations and intensities of the light captured by the sensor. The locations and intensities can then be further analyzed to separate the focused light from the streaked light. The parameters for filtering the image data can be adjusted based on the application requirements and system sensitivity. Once the background noise and the streaked light have been removed from the image data, the remaining data points can be analyzed to identify incident radiation using methods such as that disclosed in application Ser. No. 10/866,760.

Figure 7:
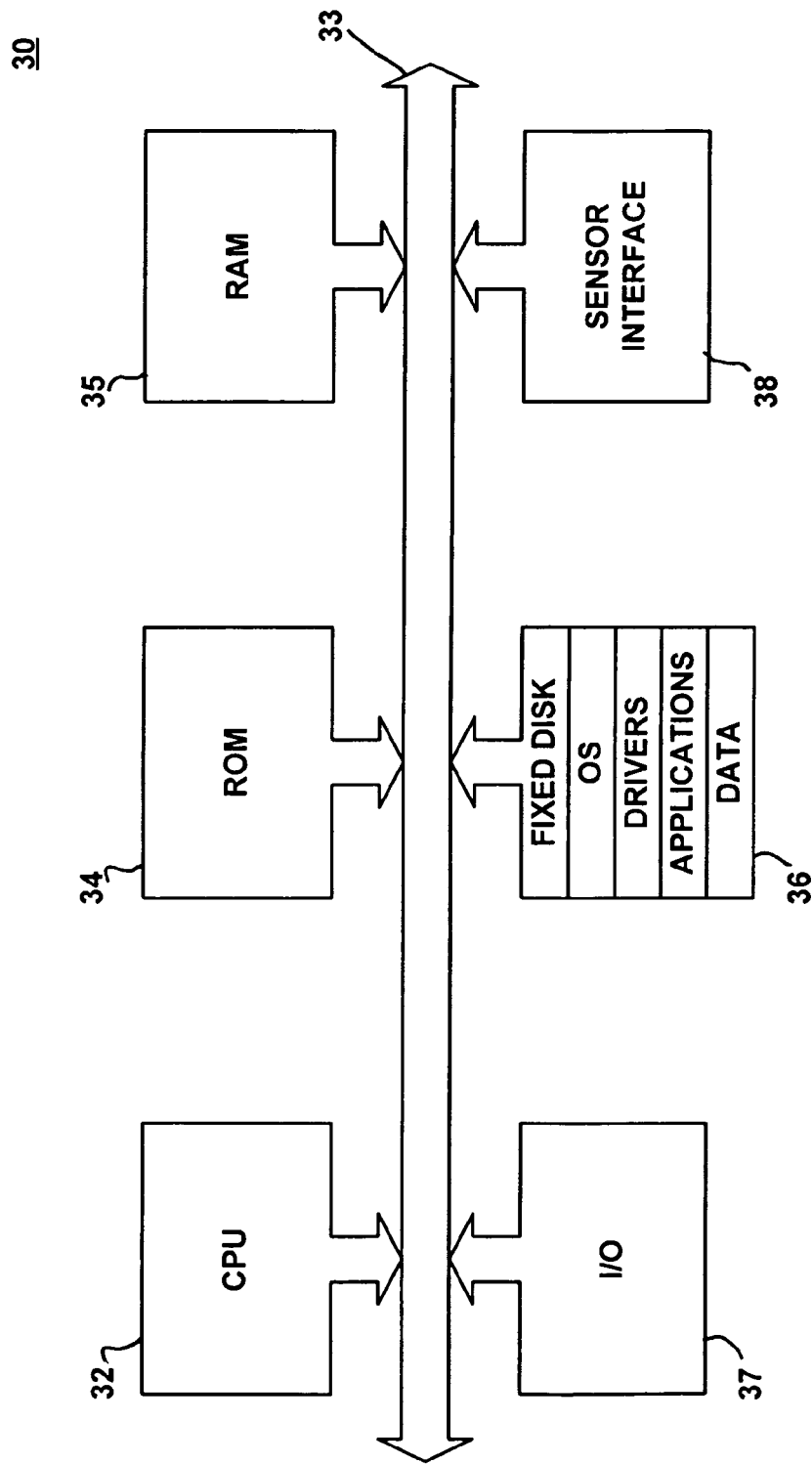
FIG. 7 is a block diagram depicting components of a processor according to one embodiment of the invention.

To process the image data read out from sensors 14a and 14b, a processor is connected to sensors 14a and 14b to receive and store the image data for further processing. The processor may be implemented within the scintillation event capture system, or may be connected to a scintillation event capture system when image data is ready to be read out of sensors 14a and 14b. FIG. 7 is a block diagram depicting the basic components of a processor 30. In particular, processor 30 comprises a central processing unit such as a programmable microprocessor (CPU) 32 that is interfaced to a data bus 33. Also interfaced to data bus 33 are read-only memory (ROM) 34, random-access memory (RAM) 35, fixed disk 36, I/O interface 37 and sensor interface 38.

CPU 32 executes program instructions sequences that have been loaded into RAM 35, which acts as a main run-time memory for CPU 32. The program instructions sequences are loaded into RAM 35 by CPU 32 from fixed disk 36 or some other computer-readable memory medium such as CD or DVD media. Fixed disk 36 stores program instruction sequences of multiple software modules. The software modules stored in fixed disk 36 include, but are not limited to, an operating system for managing the software applications and resources of processor 14; drivers for controlling and communicating with peripheral devices attached to processor 14 via I/O interface 37 and sensor interface 38; application modules for performing the processes used to implement the present invention; and data such as event lists and data representing the energy and direction of incident gamma rays reconstructed according to the present invention. ROM 34 stores invariant instruction sequences to be executed by CPU 32, such as start-up instruction sequences and basic input/output system (BIOS) instruction sequences, for the operation of certain peripheral devices attached to processor 30. I/O interface 37 provides an interface to processor 30 for input-output devices such as a keyboard, pointing device, monitor, printer, etc. Sensor interface 38 provides an interface between processor 30 and the sensors 14a and 14b and may include an analog-to-digital converter if not incorporated in sensors 14a and 14b.

Processor 30 can be implemented using a general purpose computer such as a PC-compatible computer or laptop to which sensors 14a and 14b of the present invention are interfaced. In addition, the internal components of processor 30 described above can be incorporated into a single apparatus together with the scintillation event capture system 10. Alternatively, processor 30 and the processes associated with the present invention might be implemented completely in hardware using logical circuits such as gate arrays.

The embodiments of the invention described above have utilized a scintillator block for generating the light being captured. One skilled in the art will recognize that alternative embodiments of the invention may be implemented to capture other photon producing events, and mitigate associated noise, using one or more image intensifiers and associated sensors in the manner described above without a scintillator block. For example, lighting strikes or light from fluorescent materials might be monitored and recorded.

The foregoing description is provided to enable any person skilled in the art to practice the various embodiments described herein. Various modifications to these embodiments will be readily apparent to those skilled in the art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more". All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for capturing scintillation events generated by a scintillator block upon interaction with incident radiation, the method comprising the steps of:

activating a plurality of image intensifiers configured to amplify scintillation light produced at respective faces of the scintillator block;

operating a plurality of sensors in a clear mode, wherein the plurality of sensors are optically coupled to respective ones of the plurality of image intensifiers;

detecting coincident amplification of scintillation light by the plurality of image intensifiers;

deactivating the plurality of image intensifiers upon detecting coincident amplification of scintillation light;

switching the plurality of sensors from the clear mode to an acquisition mode upon detecting coincident amplification of scintillation light, wherein the acquisition mode comprises capturing the amplified scintillation light generated by the respective ones of the plurality of image intensifiers, and wherein the plurality of sensors are switched from the clear mode to the acquisition mode in a period of time less than a decay time of the plurality of image intensifiers; and switching the plurality of sensors from the acquisition mode to a read mode, wherein the read mode comprises reading out the locations and intensities of the amplified scintillation light captured in the acquisition mode.

2. The method according to claim 1, wherein the plurality of sensors each comprise an array of elements, and wherein the clear mode comprises:

parallel shifting the contents of rows or columns of the elements in the arrays; and repeating the parallel shifting step thereby shifting the contents out of the array of elements.

3. The method according to claim 2, wherein the plurality of image intensifiers are deactivated in said deactivating step in a period of time less than the time required to parallel shift the contents of the rows or columns of the elements in the array one position.

4. The method according to claim 1, wherein said detecting step comprises:

measuring voltages applied to each of the plurality of image intensifiers for spikes;

comparing each measured spike to a threshold value;

generating a logic signal for each measured spike that exceeds the threshold value; and logically combining the logic signals from each of the plurality of image intensifiers to generate a coincident detection signal.

5. The method according to claim 4, wherein the plurality of image intensifiers are deactivated based on the coincident detection signal and the plurality of sensors are switched from the clear mode to the acquisition mode based on the coincident detection signal.

6. The method according to claim 1, wherein the deactivating step comprises changing voltages applied to the plurality of image intensifiers.

7. The method according to claim 1, wherein the plurality of sensors are switched from the clear mode to the acquisition mode and from the acquisition mode to the read mode in a period of time greater than the decay time of the plurality of image intensifiers.

8. A scintillation event capture system for capturing scintillation events generated by a scintillator block upon interaction with incident radiation, the system comprising:

a plurality of image intensifiers configured to amplify scintillation light produced by the scintillation block at respective faces of the scintillation block;

a plurality of sensors optically coupled to respective ones of said plurality of image intensifiers; and a control system configured to detect coincident amplification of scintillation light by said plurality of image intensifiers and upon detecting coincident amplification to deactivate said plurality of image intensifiers and to switch said plurality of sensors from a clear mode to a capture mode, wherein the capture mode of said plurality of sensors comprises an acquisition mode in which said plurality of sensors are configured to capture the amplified scintillation light generated by the respective ones of said plurality of image intensifiers and a read mode in which said plurality of sensors are configured to read out the locations and intensities of the amplified scintillation light captured in the acquisition mode, and wherein said control system is configured to switch said plurality of sensors from the clear mode to the acquisition mode in a period of time less than a decay time of said plurality of image intensifiers.

9. The system according to claim 8, wherein each of said plurality of sensors comprises an array of elements, and in the clear mode said plurality of sensors are configured to repeatedly parallel shift the contents of rows or columns of the elements in the arrays, thereby shifting the contents of the rows or columns out of the array of elements.

10. The system according to claim 9, wherein each of said plurality of sensors comprises a charge-coupled device.

11. The system according to claim 9, wherein said control system is configured to deactivate said plurality of image intensifiers in a period of time less than the time required to parallel shift the contents of the rows or columns of elements in the array one position.

12. The system according to claim 8, wherein said control system comprises:

a plurality of amplifiers electrically coupled to respective ones of said plurality of image intensifiers, wherein said plurality of amplifiers amplify spikes in voltages applied to said plurality of image intensifiers;

a plurality of discriminators electrically coupled to respective ones of said plurality of amplifiers, wherein said plurality of discriminators compare the amplified spikes in voltages to a threshold value and generate a logic signal for each spike that exceeds the threshold value; and an AND gate electrically coupled to said plurality of discriminators, wherein said AND gate logically combines the logic signals generated by said plurality of discriminators to generate a coincident detection signal, wherein said plurality of image intensifiers are configured to deactivate in response to the coincident detection signal and said plurality of sensors are configured to switch from the clear mode to the acquisition mode in response to the coincident detection signal.

13. The system according to claim 8, wherein each of said image intensifiers comprises:

a photocathode for converting incident photons into electrons;

a micro-channel plate for multiplying the electrons generated by said photocathode;

a phosphor screen for converting the multiplied electrons into photons; and a power supply for applying voltage between said photocathode, said micro-channel plate and said phosphor screen, wherein each of said image intensifiers is configured to be deactivated by changing at least one of the voltages applied by said power supply.

14. A radiation detector, comprising:

a scintillator block that generates scintillation light upon interaction with incident radiation;

a first image intensifier configured to amplify scintillation light generated by said scintillator block at a first face of said scintillator block;

a second image intensifier configured to amplify scintillation light generated by said scintillator block at a second face of said scintillator block orthogonal to the first face;

a first charge-coupled device optically coupled to said first image intensifier;

a second charge-coupled device optically coupled to said second image intensifier; and a control system configured to detect coincident amplification of scintillation light by said first and second image intensifiers and upon detecting coincident amplification to deactivate said first and second image intensifiers and to switch said first and second charge-coupled devices from a clear mode to a capture mode, wherein the capture mode of said first and second charge-coupled devices comprises an acquisition mode in which said first and second charge-coupled devices capture amplified scintillation light generated said first and second image intensifiers, respectively, and a read mode in which said first and second charge-coupled devices read out the locations and intensities of the amplified scintillation light captured in the acquisition mode, and wherein said control system is configured to switch said first and second charge-coupled devices from the clear mode to the acquisition mode in a period of time less than a decay time of said first and second image intensifiers.

15. The gamma ray detector according to claim 14, wherein said scintillator block comprises a plurality of layers arranged on respective parallel planes, wherein each layer comprises a plurality of fiber-optic scintillators arranged parallel to each on the plane of the layer in a direction orthogonal to the direction of the fiber-optic scintillators in adjacent layers, wherein said first image intensifier is configured to amplify the scintillation light generated by a plurality of the fiber-optic scintillators arranged in a first direction and said second image intensifier is configured to amplify the scintillation light generated by a plurality of the fiber-optic scintillators arranged in a second direction.

16. A method for capturing photon generating events, the method comprising the steps of:

activating an image intensifier configured to amplify light photons;

operating a sensor in a clear mode, wherein the sensor is optically coupled to the image intensifier;

detecting amplification of light photons by the image intensifier;

deactivating the image intensifier upon detecting amplification of light photons;

switching the sensor from the clear mode to an acquisition mode upon detecting amplification of light photons, wherein the acquisition mode comprises capturing the amplified light photons generated by the image intensifier, and wherein the sensor is switched from the clear mode to the acquisition mode in a period of time less than a decay time of the image intensifier; and switching the sensor from the acquisition mode to a read mode, wherein the read mode comprises reading out the locations and intensities of the amplified light photons captured in the acquisition mode.

17. The method according to claim 16, wherein the sensor comprises an array of elements, and wherein the clear mode comprises:

parallel shifting the contents of rows or columns of the elements in the array; and repeating the parallel shifting step.

18. The method according to claim 17, wherein the image intensifier is deactivated in said deactivating step in a period of time less than the time required to parallel shift the contents of the rows or columns of the elements in the array one position.

19. The method according to claim 16, wherein said detecting step comprises:

measuring a voltage applied to the image intensifier for spikes;

comparing each measured spike to a threshold value; and generating a detection signal for each measured spike that exceeds the threshold value.

20. The method according to claim 19, wherein the image intensifier is deactivated based on the detection signal and the sensor is switched from the clear mode to the acquisition mode based on the detection signal.

21. The method according to claim 16, wherein the deactivating step comprises changing a voltage applied to the image intensifier.

22. The method according to claim 16, wherein the sensor is switched from the clear mode to the acquisition mode and from the acquisition mode to the read mode in a period of time greater than the decay time of the image intensifier.

23. A photon event capture system, comprising:

an image intensifier configured to amplify light photons;

a sensor optically coupled to the image intensifier; and a control system configured to detect amplification of light photons by said image intensifier and upon detecting amplification of light photons to deactivate said image intensifier and to switch said sensor from a clear mode to a capture mode, wherein the capture mode of said sensor comprises an acquisition mode in which said sensor is configured to capture the amplified light photons generated by said image intensifier and a read mode in which said sensor is configured to read out the locations and intensities of the amplified light photons captured in the acquisition mode, and wherein said control system is configured to switch said sensor from the clear mode to the acquisition mode in a period of time less than a decay time of said image intensifier.

24. The photon event capture system according to claim 23, wherein said sensor comprises an array of elements, and in the clear mode said sensor is configured to repeatedly parallel shift the contents of rows or columns of elements in the array, thereby shifting the contents of the rows or columns out of the array of elements.

25. The photon event capture system according to claim 24, wherein said sensor is a charge-coupled device.

26. The photon event capture system according to claim 24, wherein said control system is configured to deactivate said image intensifier in a period of time less than the time required to parallel shift the contents of the rows or columns of elements of the array one position.

27. The photon event capture system according to claim 23, wherein said control system comprises:

an amplifier electrically coupled to said image intensifier, wherein said amplifier amplifies spikes in a voltage applied to said image intensifier;

a discriminator electrically coupled to said amplifier, wherein said discriminator is configured to compare the amplified spikes in voltage to a threshold value and generate a detection signal for each spike that exceeds the threshold value.

28. The photon event capture system according to claim 23, wherein said image intensifier comprises:

a photocathode for converting incident photons into electrons;

a micro-channel plate for multiplying the electrons generated by said photocathode;

a phosphor screen for converting the multiplied electrons into photons; and a power supply for applying voltage between said photocathode, said micro-channel plate, and said phosphor screen, wherein said image intensifier is configured to be deactivated by changing at least one of voltages applied by said power supply.

* * * * *